United States Patent [19]

Limburg et al.

[11] 3,816,667

[45] June 11, 1974

[54] SWITCHING NETWORK FOR A TELECOMMUNICATION EXCHANGE

[75] Inventors: Jan Hendrik Harmanus Limburg; Henri Peter Johannes Grubben, both of Hilversum, Netherlands

[73] Assignee: U.S. Philips Corporation, New York, N.Y.

[22] Filed: July 12, 1972

[21] Appl. No.: 271,080

[30] Foreign Application Priority Data

July 22, 1971 Netherlands ........................ 7110075

[52] U.S. Cl. ............................................ 179/18 GE

[51] Int. Cl. ............................................ H04q 3/48

[58] Field of Search ................................ 179/18 GE

[56] References Cited

UNITED STATES PATENTS

| | | | |
|---|---|---|---|
| 3,349,189 | 10/1967 | Van Bosse | 179/18 GE |
| 3,480,913 | 11/1969 | Sherstiuk | 179/18 GE |
| 3,546,387 | 12/1970 | Strunk et al. | 179/18 GE |
| 3,637,944 | 1/1972 | Gueldenpfennig | 179/18 GE |
| 3,706,856 | 12/1972 | Grundy et al. | 179/18 GE |

*Primary Examiner*—Kathleen H. Claffy
*Assistant Examiner*—C. T. Bartz
*Attorney, Agent, or Firm*—Frank R. Trifari

[57] ABSTRACT

A multi-stage switching network comprising links and matrix switches, in which each crosspoint comprises a one-winding switching relay and a rectifier. The output hold path of an energized switching relay is formed by a resistor which connects the control conductor of the output to a point of constant potential. Each link conductor comprises a gate circuit for testing the states of the output of the preceding and the input of the subsequent switching stage. A path is released by short-circuiting the switching relays via the output marking networks. Connected to the input marking multiples and the input marking points are detectors for testing the various procedures (marking, searching, tracing back, releasing).

6 Claims, 4 Drawing Figures

PATENTED JUN 11 1974

3,816,667

SWITCHING NETWORK FOR A TELECOMMUNICATION EXCHANGE

The invention relates to a switching network for a telecommunication exchange, comprising a succession of switching stages, each of which comprises a plurality of matrix switches, in which each matrix switch is provided with a group of inputs and a group of outputs, in which links are connected between each two successive switching stages, in which each input of a matrix switch comprises a marking conductor and a control conductor, in which each output of a matrix switch comprises a control conductor and in which each link comprises a link circuit which is connected between the control conductor of an output of the preceding switching stage and the control conductor of an input of the next switching stage, and comprising an input hold path which is connected between the control conductor of the input of the next switching stage and a first point of constant potential, and comprising an output hold path which is connected between the control conductor of the output of the preceding switching stage and a second point of constant potential, in which a crosspoint is defined between each input and output of a matrix switch, said crosspoint comprising a switching relay, one side of a winding of which is connected to the control conductor of the output, the other side being connected, via a contact of the switching relay, to the control conductor of the input and, via a rectifier, to the marking conductor of the input, in which input line circuits are connected to the inputs of the first switching stage, each of said input line circuits comprising an input hold path from the control conductor of the input to the first point of constant potential, in which output line circuits are connected to the outputs of the last switching stage, each of said output line circuits comprising an output hold path from the control conductor of the output to the second point of constant potential, in which output selection units are provided for selectively establishing an output marking path from an output marking point to the control conductors of the outputs of the switching stages, in which input selection units are provided for selectively establishing an input marking path from an input marking point to the marking conductors of the inputs of the switching stages, in which a switch is provided for connecting the output marking point to a source of output marking potential, and in which a switch is provided for connecting the input marking point to a source of input marking potential, said input marking potential having the same value as the potential of the second point of constant potential.

In a known switching network of this kind a relay is associated with each link, one winding of this relay being connected in the input hold path of the input of the next switching stage, one contact of the relay being connected in the output hold path of the output of the preceding switching stage. The state of the link can be tested via a second contact of this so-termed link relay.

The invention has for its object to provide a switching network of the kind set forth, without making use of link relays so that substantial material savings are achieved. It is to be noted that switching networks are known in which the switching relays of a path are held in series without application of link relays, but in these switching networks each switching relay comprises two windings or, if the switching relays have one winding, a special marking method which progresses stepwise and a special current detection circuit for each link for testing the state thereof or a store for storing the states of the links are required.

The switching network according to the invention is characterized in that the output hold path of each link conductor circuit is formed by a resistor.

The invention will be described in detail with reference to the figures.

Figure 1:
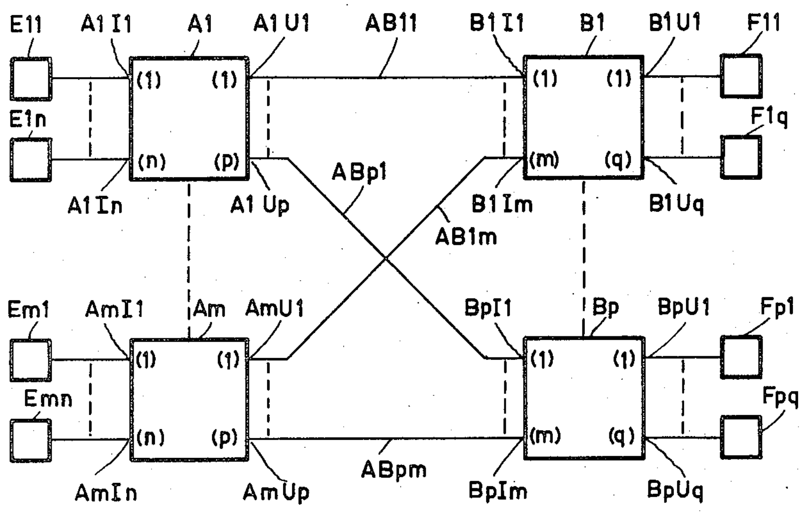
FIG. 1 is the connection diagram of a two-stage switching network.

FIG. 1 is the connection diagram of a two-stage switching network. Each switching stage comprises a plurality of matrix switches, denoted in the figure by blocks, each of which is provided with a plurality of inputs and a plurality of outputs, denoted in the figure by single lines. The two stages are coupled to each other by means of links. The inputs of the switching network are formed by the inputs of the matrix switches of the first switching stage, at the left in the figure, and the outputs of the switching network are formed by the outputs of the matrix switches of the second switching stage. Input line circuits are connected to the inputs of the switching network and output line circuits are connected to the outputs of the switching network. Between each input and each output of a matrix switch a crosspoint is defined, a switching relay and a rectifier being associated with each crosspoint.

The following figure references are used. In the expressions <element> refers to the figure reference of the element.

1. Matrix switches,
   of the first switching stages; A, number
   example: A1
   of the second switching stage: B, number
   example: B*p*
2. Connection to a matrix switch,
   input: <matrix switch>, I, number
   example: A1I1
   output: <matrix switch>, U, number
   example: B*p*U*q*
3. Element of a crosspoint,
   switching relay/rectifier: <matrix switch>, K/G, number of the input, number of the output
   example: A1K11, B*p*G1*q*
4. Input/output — conductor circuit:
   E/F, number of the matrix switch, number of the input/output
   example: E11, F1*q*
5. Designating relay of a matrix switch:
   R, <matrix switch>
   example: R A*m*
6. Relay contacts:
   number, <relay>(in lower case letters)
   example: 1*ram*, 2*a*1*k*11
7. Conductors,
   signal conductors: *a* and *b*
   drive conductor: *c*
   marking conductor: *d*
8. Each link is connected between an output of the first switching stage and an input of the second switching stage, which gives rise to the figure reference: AB, number of the output. number of the input example: AB1*m*

9. Link circuit:

T, <link conductor> example: TAB1*m*

10. Conductor of an input/output marking multiple of the first/second switching stage:

M, A/B, I/U, number example: MAI1; MBU*q*

Figure 2:
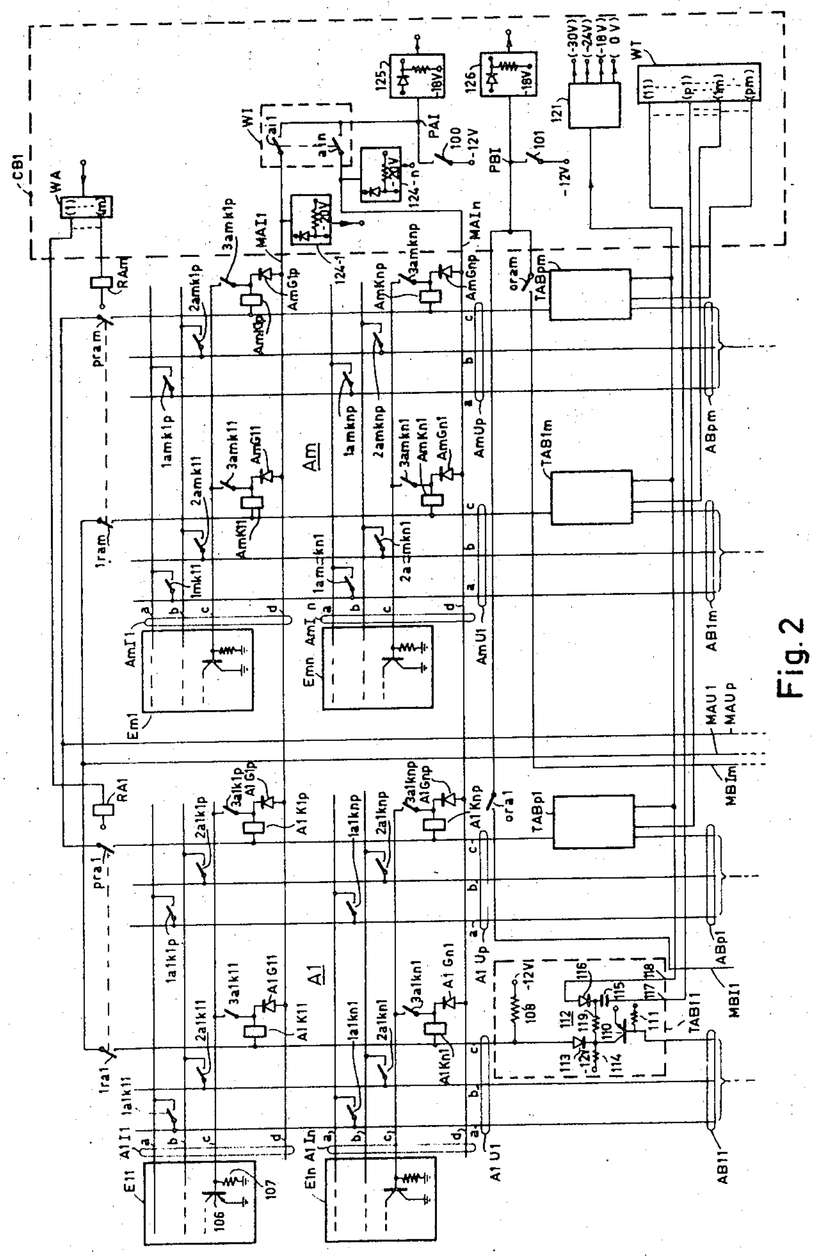
FIGS. 2 and 3 show the diagram of an embodiment of the switching network according to the invention in the two-stage design according to FIG. 1.
Figure 4:
FIG. 4 shows the arrangement of FIGS. 2 and 3.
Figure 3:
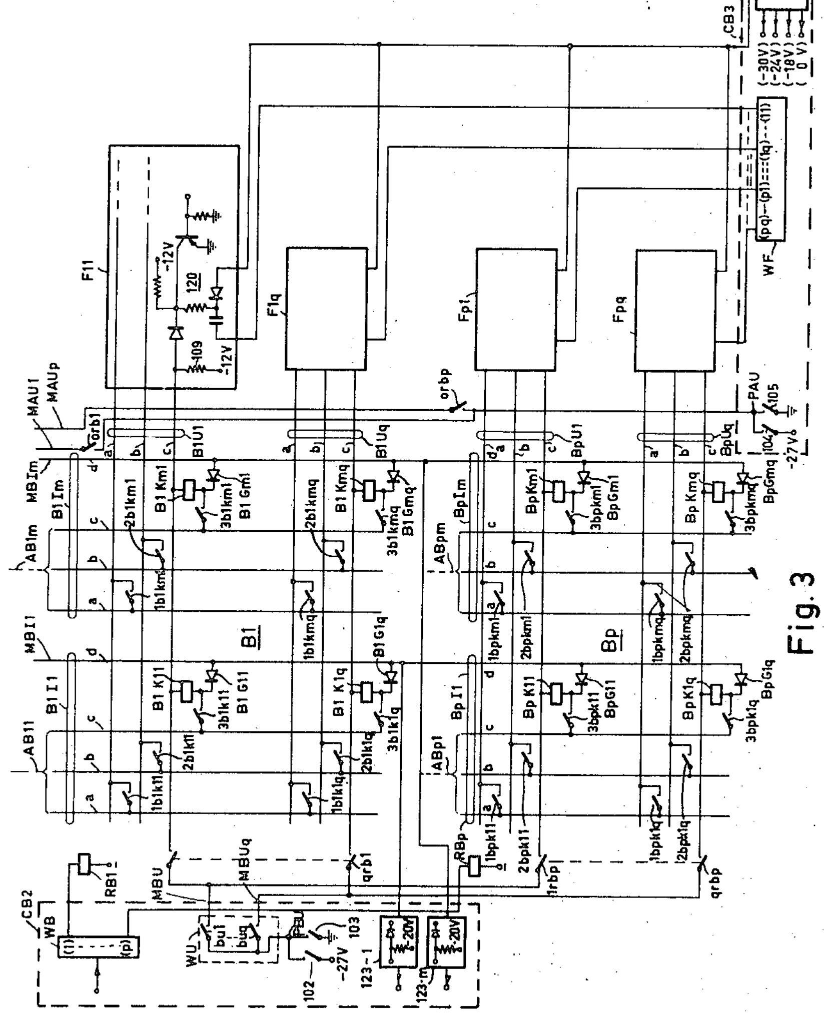

FIG. 2 and FIG. 3 together show a more detailed diagram of the switching network shown in FIG. 1, in the embodiment according to the invention. Of each matrix switch only two inputs, two outputs and the crosspoints therebetween are shown. These inputs and outputs are denoted as the first and the last input and output, respectively, of the matrix switch. It is to be understood that an arbitrary number of inputs and outputs can be present between the inputs and outputs shown. The input and output line circuits and the common control unit are shown only in as far as is necessary for proper understanding of the invention. The common control unit has the figure reference: CB, number. The number refers to one of the blocks into which the central control unit is subdivided and which are enveloped by a broken line.

Reference is now made to the matrix switch A1 which is typical of all matrix switches of the first switching stage and which, ignoring the number of inputs and outputs, is also typical of all matrix switches of the second switching stage. Matrix switch A1 is provided with *n* inputs A1I1 to A1I*n* and with *p* outputs A1U1 to A1U*p*. Each input comprises two signal conductors *a* and *b*, one control conductor *c* and one marking conductor *d*. Each output comprises two signal conductors *a* and *b* and one control conductor *c*. The crosspoint between input A1I1 and output A1U1 comprises, as is typical of all crosspoints, a switching relay A1K11 and a rectifier A1G11. The contacts 1*a*1*k*11 and 2*a*1*k*11 of the switching relay A1K11 are connected between the signal conductors *a* and *b* of the input A1I1 and the signal conductors *a* and *b* of the input A1U1. The switching relay is provided with one winding, one side of which is connected to the control conductor *c* of the output A1U1. The other side of the winding is connected, via rectifier A1G11, to the marking conductor *d* of the input A1I1 and, via the hold contact 3*a*1*k*11, to the control conductor *c* of the input A1I1.

The marking conductors *d* of the matrix switches A1 to A*m* are combined to form an input marking multiple comprising the marking conductors MAI1 to MAI*n*. The marking conductor MAI1 combines the marking conductors *d* of all inputs I1, and the marking conductor MAI*n* combines the marking conductors of all inputs I*n*. The marking multiple is connected in the central control part CB1 to an input selector WI which is represented by the relay contacts *ai*1 to *ain* of relays not shown. Each of these contacts is connected between a marking conductor and an input marking point PAI of the central control part CB1, it being possible to connect said point to a source of input marking potential (−12 volts) via a switching contact 100.

As is typical of all matrix switches of the first switching stage, a designating relay RA1 is associated with matrix switch A1. Contacts of this relay are connected between the control conductors *c* of the outputs of the matrix switch and the marking conductors MAU1 to MAU*p* of an output marking multiple. The designating relay RA*m* is associated with the matrix switch A*m*. The windings of the designating relays RA1 to RA*m* are connected in the central control part CB1 to a selector WA.

The marking conductors *d* of the matrix switches B1 to B*p* are combined to form an input marking multiple, which comprises the marking conductors MBI1 to MBI*m* (FIG. 3). This marking multiple is connected, via the contacts *ora*1 to *oram* of the designating relays of the first switching stage (FIG. 2), to an input marking point PBI in the central control part CB1. This point can be connected to a source of input marking potential (−12 volts) via a switching contact 101.

As is typical of each matrix switch of the second switching stage, a designating relay RB1 is associated with matrix switch B1. Contacts of this relay are connected between the control conductors *c* of the outputs B1U1 to B1U*q* and the marking conductors MBU1 to MBU*q* of an output marking multiple. The designating relay RB*p* is associated with matrix switch B*p*. The windings of the designating relays RB1 to RB*p* are connected in the central control part CB2 to a selector WB. The output marking multiple of the second switching stage is connected in the central control part CB2 to an output selector WU, which is represented by the relay contacts *bu*1 to *buq* of relays not shown. Each of these contacts is connected between a marking conductor and an output marking point PBU of the central control part CB2, it being possible to connect said point, via a switching contact 102, to a source of output marking potential (−27 volts) and, via a switching contact 103, to earth. The output marking multiple of the first switching stage, comprising the marking conductors MAU1 to Mau*p* (FIG. 2) is connected, via the contacts *orb*1 to *orbp* of the designating relays of the matrix switches of the second switching stage (FIG. 3), to an output marking point PAU in the central control part CB3. This point can be connected, via a switching contact 104, to a source of output marking potential (−27 volts) and, via a switching contact 105, to earth.

The links connect the switching stages in a systematical manner (FIG. 1). The outputs of matrix switch A1 are systematically connected to the first inputs I1 of the matrix switches of the second switching stage. The outputs of matrix switch A*m* are systematically connected to the $m^{th}$ inputs I*m* of the matrix switches of the second switching stage. Conversely, the inputs of matrix switch B1 are systematically connected to the first outputs U1 of the matrix switches of the first switching stage, and the inputs of the matrix switch B*p* are systematically connected to the $p^{th}$ outputs U*p* of the matrix switches of the first switching stage. When designating relay RA1 is energized, the outputs of matrix switch A1 are connected to the marking conductors MAU1 to MAU*p*, and the marking conductors MBI1 is connected, via contact *ora*1, to the input marking point PBI in CB1. The latter marking conductor is connected to the inputs I1 of the matrix switches of the second switching stage, i.e., the inputs which are accessible from matrix switch A1. The same applies to the other matrix switches of the first switching stage. Conversely, when the designating relay RB1 is energized, the outputs of matrix switch B1 are connected to the marking conductors MBU1 to MBU*q*, and the marking conductor MAU1 is connected, via contact *orb*1, to the output marking point PAU in CB3. The latter marking conductor is connected to the outputs U1 of the matrix switches of the first switching stage, i.e., the outputs from which the matrix switch B1 can be reached. The same applies to the other matrix switches of the second switching stage.

As is typical of all links, the link AB11 (FIG. 2) comprises two signal conductors *a* and *b* and a link circuit TAB11. The signal conductors *a* and *b* form a direct connection between the signal conductors *a* and *b* of output A1U1 and the signal conductors *a* and *b* of input B1I1. The link circuit TAB11 is connected between the control conductor *c* of output A1U1 and the control conductor *c* of input B1I1.

As is typical of all input line circuits, line circuit E11 comprises a transistor 106, the base electrode of which is connected to the control conductor *c* of input AI1. The emitter electrode is connected to earth and a resistor 107 is connected parallel to the emitter-base junction. This resistor keeps the transistor off when the input A1I1 is free. In this context and hereinafter it is to be understood that "off" means not conducting, "on" means conducting, "free" means that none of the switching relays of the input or output is energized, and "occupied" means that one of the switching relays is energized. If input A1I1 is occupied, the transistor 106 carries a base current which keeps the switching relay energized via the control conductor *c*. The emitter-base junction of transistor 106 forms the input hold path of the energized switching relay.

The link conductor circuit TAB11 comprises, as is typical of all link conductor circuits, a transistor 110 and a resistor 111 which is connected parallel to the emitter-base junction thereof. The base electrode of transistor 110 is connected to the drive conductor *c* of input B1I1. The emitter-base junction of this transistor forms the input hold path of input B1I1.

In accordance with the invention, the link circuit TAB11 comprises, as is typical of all link circuits, a resistor 108 which is connected between the control conductor *c* of output A1U1 and a point of constant potential (−12 volts). This resistor forms the output hold path of the energized switching relay.

The output conductor line circuit F11 comprises, as is typical of all output line circuits, a resistor 109 which is connected to the control conductor *c* of output B1U1 and the point of constant potential (−12 volts). This resistor forms the output hold path of output B1U1.

Consequently, a separate hold contact is used neither in the input hold path nor in the output hold path of a crosspoint, which results in a substantial simplification of the equipment. The resistors 108 and 109 have a value which is of the same order as that of the winding of a switching relay. The potential of the control conductor *c* of an occupied input of a matrix switch is approximately 0 volts. If output A1U1 is occupied, the potential of −12 volts is uniformly divided between resistor 108 and the winding of the energized switching relay. The control conductor *c* of an occupied output, consequently, has a potential of approximately −6 volts. The value of the resistors 108 and 109 can actually be arbitrarily chosen. The only requirement is that the current flowing through the resistor must be capable of holding a switching relay.

Marking a given path.

The marking of the path between input A1I1 and output B1U1 will be considered by way of example. The address of matrix switch A1 is applied to selector WA of CB1, so that the designating relay RA1 is energized. The address of matrix switch B1 is applied to selector WB of CB2, so that designating relay RB1 is energized. In input selector WI of CB1 the contact *ai*1 is closed in accordance with input A1I1, and in output selector WU of CB2 the contact *bu*1 is closed in accordance with output B1U1. As a result, the following marking networks are established:

1. PAU (CB3), *orb*1, MAU1, 1*ra*1, A1K11, A1G11, MAI1, *ai*1, PAI (CB1).
2. PBU (CB2), *bu*1, MBU1, 1*rb*1, B1K11, B1G11, MBI1, *ora*1, PBI (CB1).

As a result of the closing of contact 100 in CB1, −12 volts is applied to the input marking point PAI, and −27 volts is applied to the output marking point PAU as a result of the closing of contact 104 in CB3. As a result, a current starts to flow in marking circuit 1 which energizes the switching relay A1K11. In a corresponding manner the switching relay B1K11 in marking network 2 is energized due to the closing of the contact 101 in CB1 and the contact 102 in CB2.

The switching relay A1K11 closes, via the contact 3*a*1*k*11, a hold circuit to input line circuit E11. The control conductor *c* of input A1I1 receives earth potential so that rectifier A1G11 is blocked. After the opening of contact 104 in CB3, the switching relay A1K11 is hold by link circuit TAB11.

In a corresponding manner, switching relay B1K11 closes a hold circuit to link circuit TAB11 via contact 3*b*1*k*11. The control conductor *c* of input B1I1 receives earth potential, so that rectifier B1G11 is blocked. After the opening of contact 102 in CB2, the switching relay B1K11 is hold by output line circuit F11.

The selectors WA, WB, WI and WU are subsequently set to the rest position, so that the designating relays RA1 and RB1 are released and the contacts *ai*1 and *bu*1 are opened.

Releasing a given path.

The path between input A1I1 and output B1U1 will again be considered by way of example. In this case the designating relays RA1 and RB1 are energized and the contact *bu*1 is closed in selector WU of CB2 as was also the case for the marking of the path.

As a result, the following control circuits are established:

1. PAU ($CB_3$, *orb*1, MAU1, 1*ra*1, control conductor *c* of output A1U1.
2. PBU (CB2), *bu*1, MBU1, 1*rb*1, control conductor *c* of output B1U1.

Due to the closing of contact 105 in CB3, the control conductor of output A1U1 is connected to earth via control circuit 1. The control conductor *c* of input A1U1 (which is occupied) has earth potential so that the switching relay A1K11 is de-energized by short-circuiting of the winding. The switching relay B1K11 is de-energized in a similar manner by the closing of the contact 103 in CB2.

After the switching relays have been de-energized, the contacts 103 and 104 are opened and the selectors WA, WB and WU are set to the rest position.

In accordance with the invention the link circuit TAB11 comprises, as is typical of all link circuits, a logic gate circuit 112 which comprises the following elements: a diode 113 which is connected between drive conductor *c* of output A1U1 and the collector of transistor 110, a resistor 114 which is connected between a point of constant potential (−12 volts) and the collector of transistor 110, a capacitor 115 and a diode 116 which are connected in series between a scan input 117 and an output 118, and a resistor 119 which is connected between the collector of transistor 110 and the junction of capacitor 115 and diode 116.

The output line circuit F11 comprises, as is typical of all output line circuits, a gate circuit 120 which is composed in the same manner as gate circuit 112 of link circuit TAB11 and which is connected to output B1U1 in the manner in which gate circuit 112 is connected to output A1U1.

The scan inputs of the link circuits are connected to a scanner WT in CB1. The outputs of the gates are multiple connected and are connected to a detector 121 in CB1. The sensor WT is constructed to supply scanning pulses of −18 volts.

If input B1I1 is free, transistor 110 is off. If output A1I1 is also free, capacitor 115 is charged, via the resistors 114 and 119, to a voltage of −12 volts. If a scanning pulse of −18 volts is received in this situation on input 117, a pulse of −30 volts appears on output 118.

If output B1I1 is occupied, transistor 110 is on and capacitor 115 is discharged to 0 volts. If a scanning pulse of −18 volts is received in this situation, a pulse of −18 volts appears an output 118.

If output A1U1 is occupied, control conductor *c* has a potential of −6 volts. If input B1I1 is free, but output A1U1 is still occupied, capacitor 115 will not be charged further than this −6 volts. If in this situation a scanning pulse of −18 volts is received, a pulse of −24 volts appears on output 118. The resistor 114 has a valve which is large with respect to that of resistor 108, so that the potential of control conductor *c* is maintained at approximately −6 volts.

The detector 121 in CB1 is constructed such that it can make a distinction between pulses of −30 volts, −24 volts, −18 volts and 0 volts. This is symbolically indicated in FIG. 2 by four outputs, the voltage at which the output supplies a signal being shown between( ). A pulse of 0 volts or the absence of a pulse occurs in the case of a conductor interruption, an interruption in the gate circuit or if the link circuit is completely absent. The indication of a pulse of 0 volts is used for checking purposes.

The scan inputs of the output line circuits are connected, similar to the link circuits, to a scanner WF in CB3. The outputs of the gate circuits of the output line circuits are multiple connected and are connected to a detector 122 in CB3 which is constructed in the same way as detector 121 in CB1.

Searching a free path.

If a path is to be established between a given input and a given output, only one link qualifies in the two-stage switching unit under consideration. The scanner WT in CB1 is then adjusted to this link and it is tested, by means of detector 121, whether the link is free on both ends. Another possibility is to make the scanner WT circuits freely and to perform the free-busy test only at the instant at which scanner WT is adjusted to the desired link. This instant can be determined by comparing the position of the scanner at any instant with the address of the link.

Another task may be the searching of one free path from a given group of matrix switches of the first switching stage to a given output of the second switching stage. In this case the scanner WT is successively adjusted to the links which are connected to the matrix switch of the second switching stage and which originate from the given group of matrix switches of the first switching stage. Another possibility is to make the scanner circulate freely and to perform the free-busy test only at the instants at which the scanner is adjusted to a qualified link. These instants can again be determined by comparing the position of the scanner at any given instant with the addresses of the links.

Another task yet may be the searching of one free path between a given input and an arbitrary free output of a given group of outputs. In this case a free output can first be determined, by means of scanner WF in CB3 and detector 122, and subsequently it can be tested, by means of scanner WT in CB1 and detector 121, whether the link is free. Also in this case it is possible to let the scanners WT and WF circulate freely and to perform the free-busy test only at given instants. The circulation of the scanners WT and WF can be advantageously coordinated, for example, such that in a first sub-cycle WF scans all outputs U1, whilst WT scans all links of matrix switch A1; WF subsequently scanning all outputs U2 in a second sub-cycle, whilst WT senses all links of matrix switch A2, and so on.

Tracing back a path.

Tracing back is to be understood to mean the determining of the established path from a given output of the switching unit in the direction of the input. Tracing back is effected prior to the release of the established path, and in that case tracking back need not be effected further than as far as the output of the first switching stage. Tracing back is also performed for the identification of the input for the purpose of a delayed free-busy test on the input line circuit, or forcing the release of the input line circuit.

The case where output B1U1 is given will be considered by way of example. In accordance with output B1U1, the designating relay RB1 is energized and the contact *bu*1 of selector WU in CB2 is closed. Subsequently, the contact 102 in CB2 is closed so that the following search circuit is realized:

1. −27 volts (CB2), 102, PBU, *bu*1, MBU1, 1*rb*1, control conductor *c* of output B1U1; from this output the circuit branches out, via the windings and rectifiers of the non-energized crosspoints, to the marking conductors *d* of the free inputs.

It is assumed that the switching relay B1K11 is energized, which means that the output B1U1 is connected to the input B1I1. The −27 volts on the control conductor *c* of output B1U1 does not change the state of switching relay B1K11. The control conductor *c* of input B1I1 has earth potential and the contact 3*b*1*k*11 is closed so that the passage of the −27 volts to the marking conductor *d* of input B1I1 is blocked. The −27 volts, however, can penetrate to the marking conductors *d* of the free inputs via the windings of the non-energized switching relays and the rectifiers. The detectors 123-1 to **123-*m*** in CB2 are connected to the marking conductors MBI1 to MB*im* of the input marking multiple of the second switching stage. These detectors have a threshold of −20 volts and react to voltages which are more negative than −20 volts, i.e., voltages of −27 volts. If −27 volts are applied to the output B1U1 in the described manner, all detectors react but one, i.e., 123-1. The latter identifies the input to which the output B1U1 is connected, i.e., the input B1I1.

Each input is connected, via a link to an output of the first switching stage, so that by the identification of the input of the second switching stage the output of the first switching stage is indirectly indentified, in this example the output A1U1. If the path is to be released, the tracing back has now been completed. If the input of the switching unit is to be identified, the designating relay RA1 is energized in accordance with the determined output A1U1 of the first switching stage. The contact 104 in CB3 is subsequently closed, so that the following search circuit is established:

2. −27 volts (CB3), 104, PAU, *orb*1, MAU1, 1*ra*1, control conductor *c* of output A1U1.

The input of matrix switch A1, connected to the output A1U1, is identified by the detectors 124-1 to **124-*n*, which are connected in CB1 to the marking conductors MAI1 to MAI*n*** of the input marking multiple of the first switching stage.

Releasing a path whose output is given.

For releasing a path whose output is given, first the first part of the procedure described in the chapter "Tracing back a path" is performed. After the output of the first switching stage has thus been identified, the procedure described in chapter "Releasing a given path" is performed.

Releasing an already partly released path.

If a matrix switch of the second switching stage is removed from the switching network, for example, for replacement, at the instant that a path is in existence via the matrix switch, this path cannot be determined according to the procedure described in chapter "Tracing back a path." In this case a link on the side of the output of the first switching stage is occupied while it is free on the input of the second switching stage. In this case the link circuit supplies a pulse of −24 volts when scanned by scanner WT in CB1, as described in the foregoing. The links which are in the state under consideration, consequently, can be traced back by scanning. After a partly released path has been determined, it can be interrupted in the first switching stage in the manner described in chapter "Releasing a given path."

The above case is a consequence of an operating error which should normally not occur. An analogous case, however, can occur in the output line circuits as part of a normal procedure according to which the output of the output line circuit is made free before the input is made free. Output line circuits which are in this condition supply a pulse of −24 volts when scanned, and can thus be identified. After this identification, the procedure described in chapter "Releasing a path whose output is given" can be performed.

The detectors 125 and 126 are connected to the input marking points PAI and PBI in CB1. These detectors have a threshold of −18 volts and react to voltages which are less negative than −18 volts, i.e., voltages of −12 volts. The detectors 125 and 126, 123-1 to **123-*m* and 124-1 to 124-*n*** are used for checking the proper operation of the switching network. The checking facilities offered by these detectors will be described with reference to the application thereof in the marking procedure. However, it is to be understood that the checking facilities in adapted form, can also be used for the other procedures (searching, tracing back and releasing procedures).

Checking the marking procedure

The marking of switching relay B1K11 will be considered by way of example. In the following: $t_1$, $t_2$, - - - denote a series of instants which occur in succession and which serve no other purpose than to divide the time required by the marking procedure into a number of significant parts.

*t*1: The designating relay RB1 and the designating relay RA1 are energized. The contact *bu*1 in selector WU of CB2 is closed. The marking circuit 1. is thus established.

*t*2: Check whether all detectors 123-1 to **123-*m*** do not react. As the output marking potential is not yet switched on, none of these detectors may react at this instant.

Checking whether the detector 126 does not react. The rectifiers of the crosspoints of input B1I1 are thus checked for short-circuits. If one of the rectifiers has a short-circuit, a current can flow from the output conductor circuit, via the crosspoint, to the marking conductor MBI1 and from there to the detector 126.

*t*3: Contact 102 in CB1 is closed, so that the output marking potential of −27 volts is applied to marking circuit 1.

*t*4: Checking whether all detectors 123-1 to **123-*m* react. It is thus checked whether none of the switching relays B1K11 to B1K*m*1** is energized, and the operation of the detectors themselves is also checked. At the same time it is checked whether the relay windings and the rectifiers have no interruptions. An energized switching relay applies earth potential to the rectifier via the hold contact, thus blocking the passage of the −27 volts to the input, so that one of the detectors will not react. As at this instant none of the switching relays may be energized, all detectors must react.

*t*5: The contact 101 in CB1 is closed so that the input marking potential of −12 volts is applied to marking circuit 1. The switching relay B1K11 must then be energized.

*t*6: Checking whether detector 126 reacts. The operation of the detector itself is thus checked. As the −12 volts input marking potential is directly applied to the detector via contact 101, the detector should react.

*t*7: The contact 101 is opened.

*t*8: Checking whether detector 126 no longer reacts.

Checking whether one of the detectors 123-1 to **123-*m* no longer reacts. As the relay B1K11 must now be energized, the passage of the −27 volts output marking potential to the input B1I1 must be blocked and detector 123-1** should no longer react.

*t*9: The contact 102 is opened and the contact *bu*1 in selector WU of CB2 is opened.

The marking procedure in the first switching stage is completely analogous to the marking procedure in the second switching stage, utilizing the detectors 124-1 to **124-*n* and 125.** The marking procedure in the first switching stage can be performed simultaneously with the marking procedure in the second switching stage, but can also be performed consecutively. In the latter case the same detectors as used during the marking procedure in the second switching stage can be used during the marking procedure in the first switching stage. After completion of the marking procedure in the second switching stage, these detectors are then switched over in a suitable manner from the input marking multiple of the second switching stage to that of the first switching stage, and from the input marking point PBI of the second switching stage to the input marking point PAI of the first switching stage.

What is claimed is:

1. A switching network for a communication exchange, comprising a succession of switching stages, each of which comprises a plurality of matrix switches, in which each matrix switch is provided with a group of inputs and a group of outputs, in which links are connected, between each two successive switching stages, in which each input of a matrix switch comprises a marking conductor and a control conductor, in which each output of a matrix switch comprises a control conductor and in which each link comprises a link circuit which is connected between the control conductor of an output of the preceding switching stage and the control conductor of an input of the next switching stage, said link circuit comprising an input hold path which is connected between the control conductor of the input of the subsequent switching stage and a first point of constant potential, and comprising an output hold path which is connected between the control conductor of the output of the preceding switching stage and a second point of constant potential, in which a crosspoint is defined between each input and each output of a matrix switch, said crosspoint comprising a switching relay, one side of a winding of which is connected to the control conductor of the output, the other side being connected, via a contact of the switching relay, to the control conductor of the input and, via a rectifier, to the marking conductor of the input, in which input line circuits are connected to the inputs of the first switching stage, each of said input line circuits comprising an input hold path from the control conductor of the input to the first point of constant potential, in which output line circuits are connected to the outputs of the last switching stage, each of said output line circuits comprising an output hold path from the control conductor of the output to the second point of constant potential, in which output selection units are provided for selectively establishing an output marking path from an output marking point to the control conductors of the outputs of the switching stages, in which input selection units are provided for selectively establishing an input marking path from an input marking point to the marking conductors of the inputs of the switching stages, in which a switch is provided for connecting the output marking point to a source of output marking potential, and in which a switch is provided for connecting the input marking point to a source of input marking potential, said input marking potential having the same value as the potential of the second point of constant potential, characterized in that the output hold path of each link circuit is formed by a resistor.

2. A switching network as claimed in claim 1, characterized in that each link circuit comprises a logic gate circuit, an input of which is coupled to the control conductor of the output of the preceding switching stage, an input of which is coupled to the control conductor of the input of the subsequent switching stage, said logic gate circuit being constructed for producing different output signals in reaction to different combinations of input signals, and a detector responsive to said output signals for facilitating the search for a free path through the switching network.

3. A switching network as claimed in claim 2, characterized in that the logic gate circuit comprises a capacitor which is connected in a charging network, said charging network being coupled to the control conductors of the input of the subsequent and the output of the preceding switching stage, said capacitor being coupled to a scan input for receiving scanning pulses and to an output for supplying pulses the amplitude of which is different for different combinations of states of the input of the subsequent and the output of the preceding switching stage.

4. A switching network as claimed in claim 1, characterized in that voltage detectors are provided for detecting the presence of output marking potential on the marking conductors of the inputs of the matrix switches and for detecting the presence of the potential of the second point of constant potential on the input marking points.

5. A switching network as claimed in claim 1, characterized in that the resistor has a resistance value which is of the same value as that of the winding of a switching relay.

6. A switching network as claimed in claim 1, characterized in that a switch is provided for connecting the output marking point to the first point of constant potential, an output marking path being established to the output of the crosspoint and the switch being temporarily closed in order to de-energise a switching relay.

* * * * *